(12) United States Patent
Chiu

(10) Patent No.: US 6,402,166 B1
(45) Date of Patent: Jun. 11, 2002

(54) LOCKING DEVICE FOR LIMITING SWIVELING MOVEMENT OF A FRONT WHEEL OF A STROLLER

(76) Inventor: Ping-Jan Chiu, No. 1146, Chung-Shan Road, Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/664,015

(22) Filed: Sep. 19, 2000

(51) Int. Cl.[7] ................................................. B62B 7/00
(52) U.S. Cl. .................... 280/47.38; 280/647; 280/658; 16/35 R
(58) Field of Search ............................. 16/35 R, 35 D; 280/642, 647, 648, 657, 658, 47.38

(56) References Cited

U.S. PATENT DOCUMENTS

| 199,931 A | * | 2/1878 | Pope et al. | 16/35 R |
|---|---|---|---|---|
| 1,709,845 A | * | 4/1929 | Eberly | 16/35 R |
| 3,085,285 A | * | 4/1963 | Morlik | 16/35 R |
| 3,988,800 A | * | 11/1976 | Sachser | 16/35 R |
| 4,028,773 A | * | 6/1977 | Morgan | 16/35 R |
| 4,349,983 A | * | 9/1982 | Fontana | 16/35 R |
| 5,669,624 A | * | 9/1997 | Eichhorn | 280/642 |
| 5,727,285 A | * | 3/1998 | Goman | 16/38 |
| D419,113 S | * | 1/2000 | Everett | D12/129 |

* cited by examiner

Primary Examiner—Brian L. Johnson
Assistant Examiner—Bryan Fischmann
(74) Attorney, Agent, or Firm—Ladas & Parry

(57) ABSTRACT

A locking device for a stroller includes a stem member disposed on a front wheel frame of the stroller. The stem member has a reduced intermediate portion with a radial locking hole. A coupling member is disposed to interconnect right and left ends of a connecting frame of the stroller, and is sleeved on and is turnable relative to the stem member. A lateral mount member has one end disposed on the coupling member, and a through hole communicated with the stem member and aligned with the locking hole when the coupling member is turned relative to the stem member to a lockable position. A locking member has a spindle portion disposed in the through hole, and includes an actuated end and a latch portion extendable into and retractable from the locking hole.

4 Claims, 5 Drawing Sheets

LOCKING DEVICE FOR LIMITING SWIVELING MOVEMENT OF A FRONT WHEEL OF A STROLLER

BACKGROUND OF THE INVENTION

1. Field of the Invention

The invention relates to a locking device for a three-wheeled stroller, more particularly to a locking device for limiting swiveling movement of the front wheel of a stroller.

2. Description of the Related Art

A conventional three-wheeled stroller is shown in FIG. 1. As illustrated, the stroller includes a front frame 1, a handle 2 disposed on an upper end of the front frame 1, a rear wheel frame 3 pivotally coupled to a rear end of the front frame 1, and a front wheel frame 4 coupled to a lower end of the front frame 1. The front wheel frame 4 has a front end provided with a front wheel 5, and a rear end connected to the rear wheel frame 3 for mounting of two rear wheels 6. The stroller further includes a seat 8, a canopy 9, and a basket 701 mounted on a basket frame 7. A drawback of the stroller resides in that since the front wheel 5 is mounted at the front end of the front wheel frame 4, it cannot freely swivel. Steering of the stroller is therefore inconvenient. Although there are three-wheeled strollers provided with a swivelable front wheel to facilitate steering, they do not have any locking device to limit swiveling of the front wheel when desired.

SUMMARY OF THE INVENTION

Therefore, the main object of the present invention is to provide a locking device for limiting swiveling movement of the front wheel of a stroller.

Accordingly, a locking device of the present invention is adapted for use on a stroller which includes a rear wheel axle, a connecting frame, and a front wheel frame. The rear wheel axle has two lateral ends provided with two rear wheels rotatable about a first axis parallel thereto. The connecting frame has right and left connecting rods, each including proximate and distal portions. The proximate portions of the right and left connecting rods are connected to the two lateral ends respectively at positions inboard to the two rear wheels, respectively. The distal portions of the right and left connecting rods extend forwardly from the respective proximate portions towards each other to form right and left terminated ends, which are spaced apart from each other in a transverse direction parallel to the rear wheel axle. The front wheel frame includes a lower wheel mounting end provided with a front wheel rotatable about a second axis parallel to the first axis, and an upper seat end opposite to the lower wheel mounting end in a first radial direction relative to the second axis. The locking device includes a stem member defining a swivel axis and including a lower portion adapted to be disposed on the upper seat end, an upper portion opposite to the lower portion in an axial direction parallel to the swivel axis, and an intermediate portion interposed between the upper and lower portions and defining a locking hole extending in a second radial direction relative to the swivel axis. A coupling member is adapted to interconnect the right and left terminated ends, and includes a first inner annular wall sleeved on and turnable relative to the stem member about the swivel axis. A lateral mount member includes a proximate end disposed on the coupling member, and a distal end extending from the proximate end in the second radial direction. The lateral mount member has a second inner annular wall extending from the distal end to the proximate end to define a through hole with a third axis such that the through hole is communicated with the first inner annular wall at the proximate end, and such that the third axis is aligned with the locking hole when the coupling member is turned relative to the stem member to a lockable position. A locking member includes a spindle portion disposed in the through hole and movable retainingly relative to the second inner annular wall. The locking member extends in the second radial direction and outwardly of the distal end to form an actuated end for external operation. A latch portion is secured to and extends from the spindle portion away from the actuated end. The latch portion is movable between a locked position, where the latch portion is brought by the spindle portion to move into the locking hole, and an unlocked position, where the latch portion is retracted outwardly of the locking hole.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
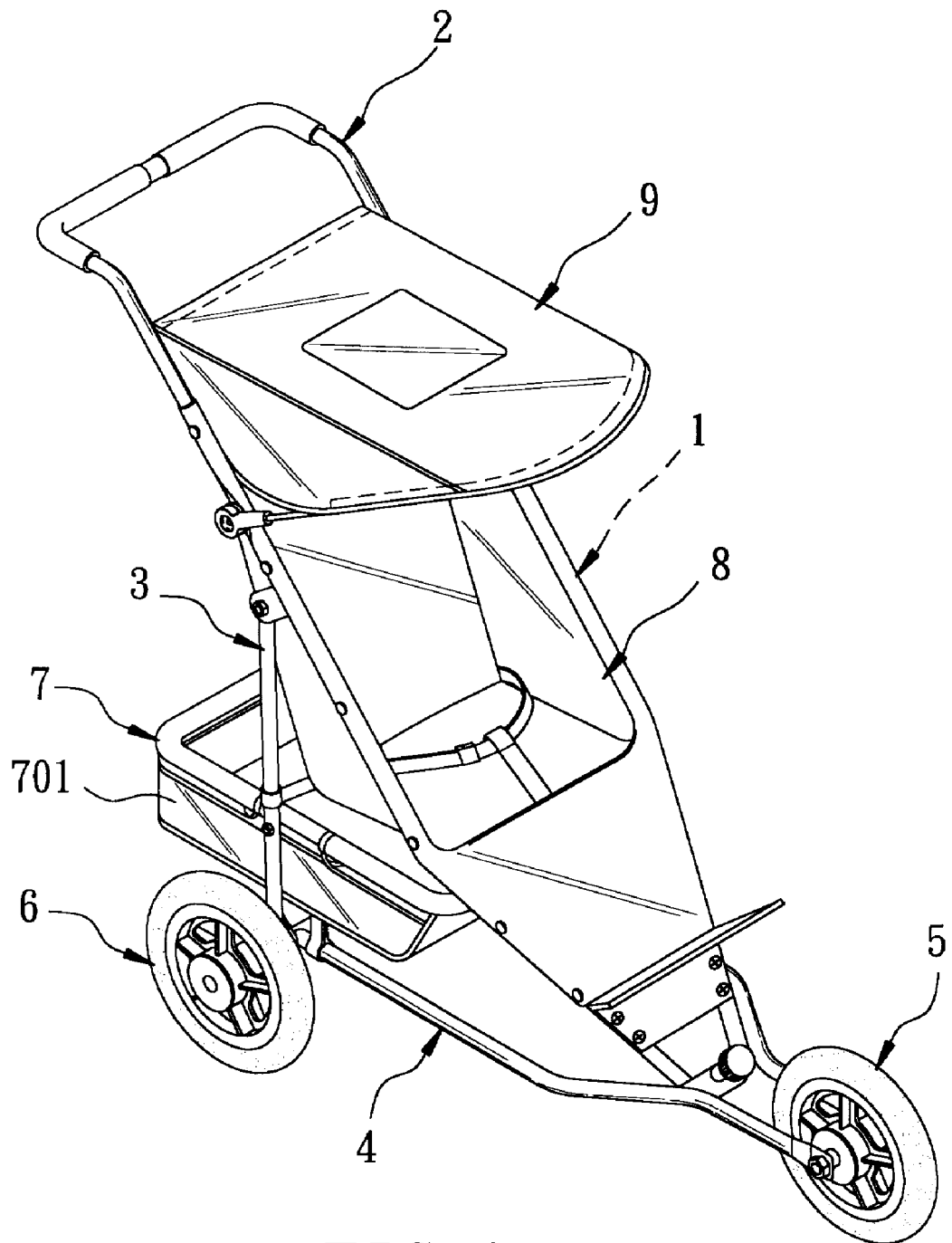
FIG. 1 is a perspective view of a conventional three-wheeled stroller.
Figure 2:
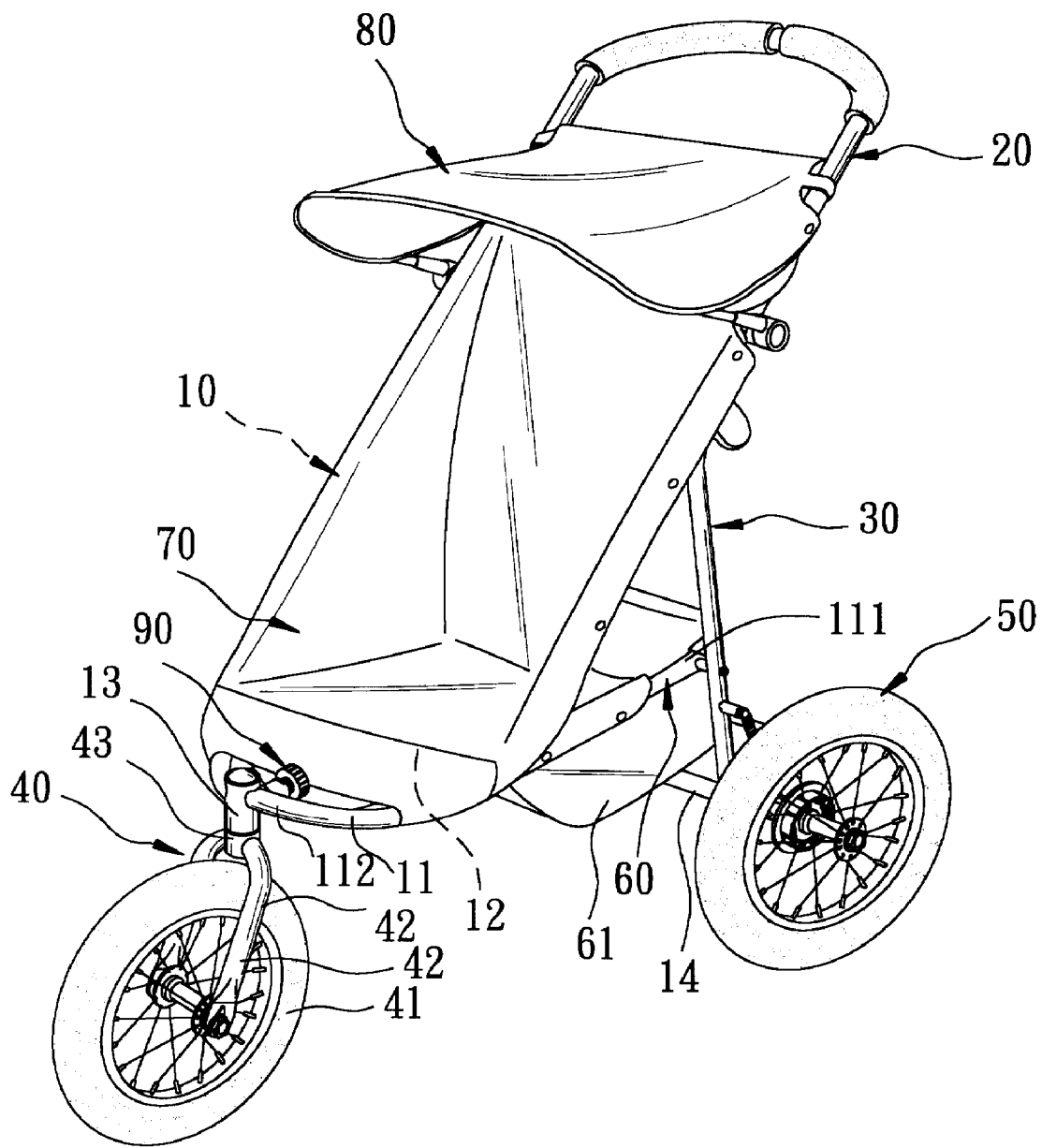
FIG. 2 is an assembled perspective view of a stroller embodying the preferred embodiment of a locking device according to the invention.
Figure 3:
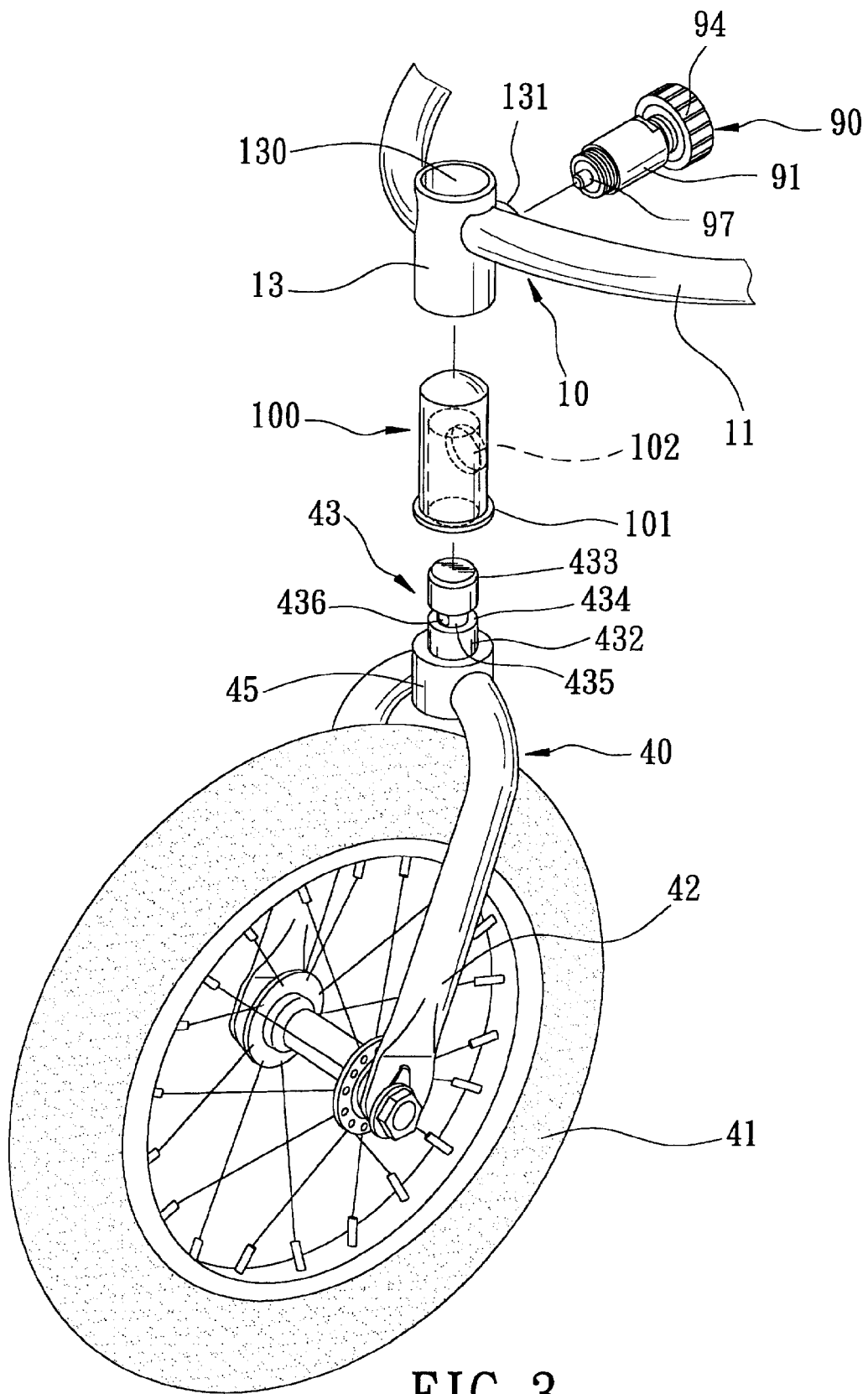
FIG. 3 is an exploded perspective view of the preferred embodiment adapted for use on the front wheel of the stroller.

Referring to FIGS. 2 and 3, the preferred embodiment of a locking device of this invention is adapted for limiting swiveling movement of a front wheel 41 of a stroller. The stroller is shown to include a seat frame 10, a handle 20 connected to the seat frame 10, a rear wheel frame 30 having a rear wheel axle 14, a front wheel frame 40, a connecting frame 60, a seat 70, a canopy 80, and a basket 61 mounted on the connecting frame 60. The rear wheel axle 14 has two lateral ends provided with two rear wheels 50 rotatable about a first axis parallel to the rear wheel axle 14. The connecting frame 60 has right and left connecting rods 11 with proximate and distal portions 111, 112. The proximate portions 111 of the right and left connecting rods 11 are connected to the two lateral ends respectively at positions inboard to the two rear wheels 50, respectively. The distal portions 112 of the right and left connecting rods 11 extend forwardly from the respective proximate portions 111 towards each other to form right and left terminated ends, which are spaced apart from each other in a transverse direction parallel to the rear wheel axle 14. The seat frame 10 has a horizontal bar 12 connected to the right and left connecting rods 11 of the connecting frame 60. The front wheel frame 40 includes a lower wheel mounting end 42 which is provided with the front wheel 41. The front wheel 41 is rotatable about a second axis which is parallel to the first axis. The front wheel frame 40 further includes an upper seat end 45 opposite to the lower wheel mounting end 42 in a first radial direction relative to the second axis.

Figure 4:
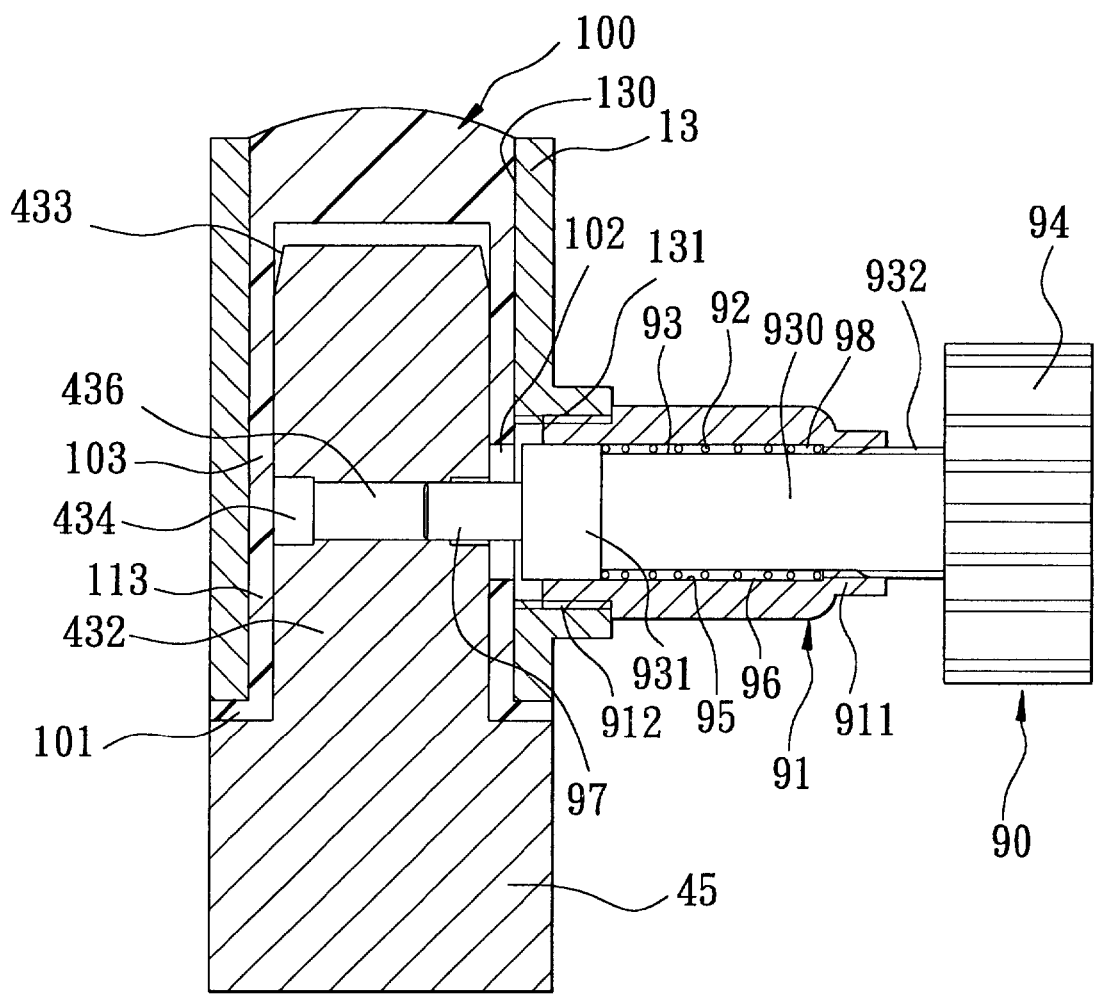
FIG. 4 is an assembled sectional view of the preferred embodiment in a locked position.
Figure 5:
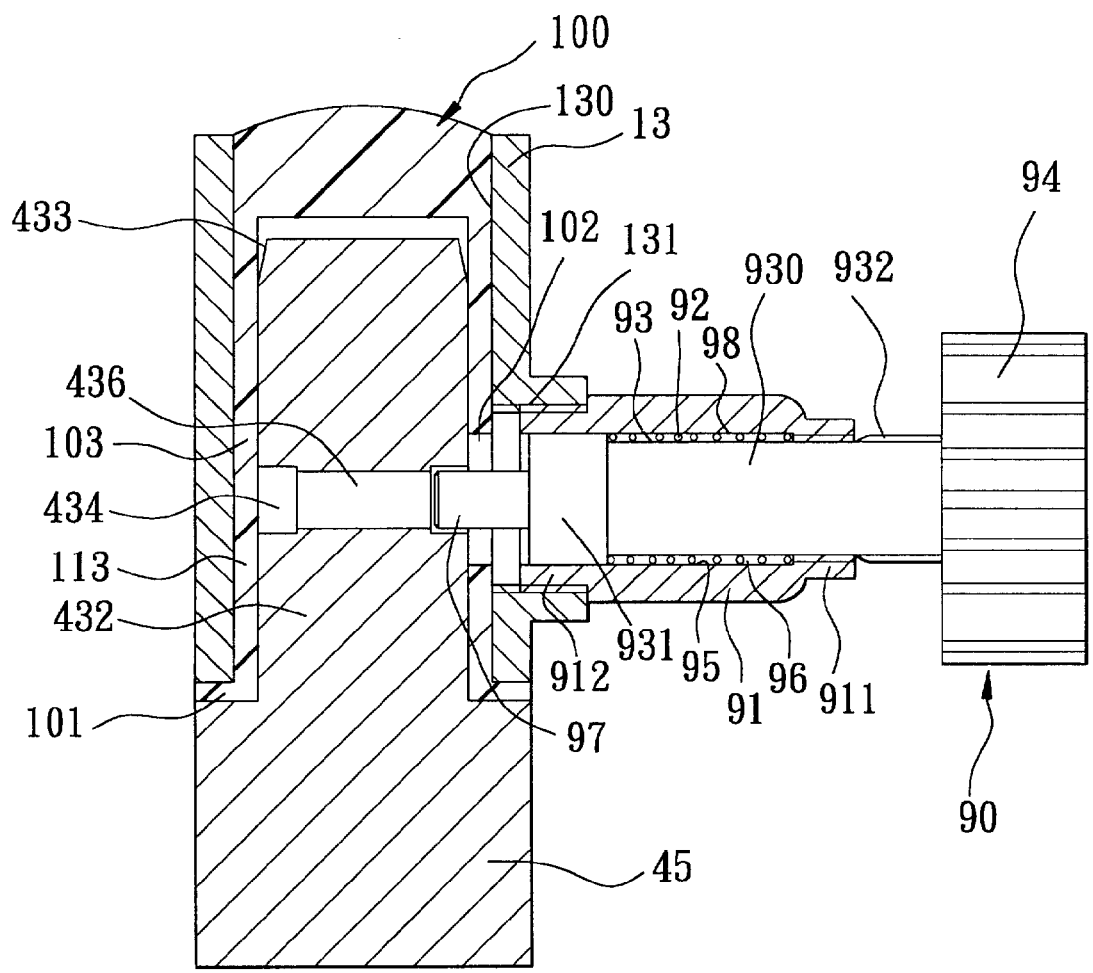
FIG. 5 is an assembled sectional view of the preferred embodiment in an unlocked position.

With reference to FIGS. 3 to 5, the locking device according to the present invention is shown to include a stem member 43, a coupling member 13, a lateral mount member 91, and a locking member 90. The stem member 43 defines a swivel axis, and includes a lower portion 432 adapted to be disposed on the upper seat end 45, an upper portion 433 opposite to the lower portion 432 in an axial direction parallel to the swivel axis, and an intermediate portion 435 interposed between the upper and lower portions 433, 432 and defining a locking hole 436 that extends in a second radial direction relative to the swivel axis. The intermediate portion 435 has a diameter smaller than those of the upper and lower portions 433, 432 so as to form an annular guiding groove 434 between the upper and lower portions 433, 432.

The coupling member 13 is adapted to interconnect right and left terminated ends, and includes a first inner annular wall 130 that is sleeved on and that is turnable relative to the stem member 43 about the swivel axis. The coupling member 13 further has a lateral mounting hole 131 for mounting of the lateral mount member 91 and the locking member 90.

The lateral mount member 91 includes a proximate end 912 disposed on the coupling member 13, and a distal end 911 extending from the proximate end 912 in the second radial direction. The lateral mount member 91 has a second inner annular wall 95 extending from the distal end 911 to the proximate end 912 to define a through hole 96 with a third axis such that the through hole 96 is communicated with the first inner annular wall 130 at the proximate end 912, and such that the third axis is aligned with the locking hole 436 when the coupling member 13 is turned relative to the stem member 43 to a lockable position.

The locking member 90 includes a spindle portion 93 disposed in the through hole 96 and retainingly movable relative to the second inner annular wall 95. The spindle portion 93 extends in the second radial direction and outwardly of the distal end 911 of the lateral mount member 91 to form an actuated end 94 for external operation. A latch portion 97 is secured to and extends from the spindle portion 93 away from the actuated end 94. The latch portion 97 is movable between a locked position, where the latch portion 97 is brought by the spindle portion 93 to move into the locking hole 436, and an unlocked position, where the latch portion 97 is retracted outwardly of the locking hole 436. In the unlocked position, the front wheel 41 can freely swivel to facilitate steering of the stroller. In the locked position, the front wheel 41 can be positioned to move in a linear direction only for smooth linear advancement of the stroller or for parking purposes.

Furthermore, the spindle portion 93 includes an externally threaded distal segment 932 adjacent to the actuated end 94 and threadedly engageable with the second inner annular wall 95 so as to be retainingly movable relative thereto when the latch portion 97 moves between the locked and unlocked positions and so as to keep the latch portion 97 in one of the locked and unlocked positions. In addition, the spindle portion 93 includes a proximate segment 931 opposite to the distal segment 932 in the second radial direction and disposed to be in sliding contact with the second inner annular wall 95 when the spindle portion 93 is threadedly moved relative to the second inner annular wall 95. A middle segment 930 is disposed between the proximate and distal segments 931, 932, and is spaced apart from the second inner annular wall 95 in a third radial direction relative to the second radial direction so as to define an annular chamber 98 therebetween.

The locking device further includes a coil spring 92 disposed in the annular chamber 98 and wound around the middle segment 930 so as to provide resistance to the spindle portion 93 when the latch portion 97 is moved to the unlocked position. In the unlocked position, the latch portion 97 is guided by the guiding groove 434 to move angularly when the coupling member 13 is turned relative to the stem member 43 about the swivel axis, and is kept in the unlocked position against the biasing force of the coil spring 92 by an end face of the distal segment 932 which abuts against the distal end 911 (see FIG. 5). Furthermore, a bushing member 100 is disposed to be turned with the coupling member 13, and includes a third annular wall 103 interposed between the first inner annular wall 130 and the stem member 43. The third annular wall 103 extends in the axial direction to form a lower annular segment 113, which interrupts communication between the through hole 96 and the intermediate portion 435. The third annular wall 103 defines a bore 102 which extends along the third axis and which is aligned with the through hole 96 so as to permit the latch portion 97 to move into the locking hole 436. In addition, the bushing member 100 has a closed top end for enclosing the components of the stem member 43, and a lower outwardly extending annular flange 101 for abutting against an upper surface of the upper seat end 45 so as to absorb the impact transmitted by the front wheel 40 upon the seat frame 10.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A locking device for a stroller which includes
   a rear wheel axle with two lateral ends which are provided with two rear wheels rotatable about a first axis parallel to said rear wheel axle,
   a connecting frame having right and left connecting rods, each including proximate and distal portions, said proximate portions of said right and left connecting rods being connected to said two lateral ends respectively at positions inboard to said two rear wheels, respectively, said distal portions of said right and left connecting rods extending forwardly from respective ones of said proximate portions towards each other to form right and left terminated ends, which are spaced apart from each other in a transverse direction parallel to said rear wheel axle, and
   a front wheel frame including a lower wheel mounting end which is provided with a front wheel rotatable about a second axis parallel to the first axis, and an upper seat end opposite to said lower wheel mounting end in a first radial direction relative to the second axis,
   said locking device comprising:
   a stem member defining a swivel axis and including a lower portion adapted to be disposed on said upper seat end, an upper portion opposite to said lower portion and extending in an axial direction parallel to the swivel axis, and an intermediate portion interposed between said upper and lower portions and defining a locking hole extending in a second radial direction relative to the swivel axis;
   a coupling member adapted to interconnect the right and left terminated ends, and including a first inner annular wall sleeved on and turnable relative to said stem member about the swivel axis;
   a lateral mount member including a proximate end disposed on said coupling member and a distal end extending from said proximate end in the second radial direction, said lateral mount member having a second inner annular wall extending from said distal end to said proximate end to define a through hole with a third axis such that said through hole is communicated with said first inner annular wall at said proximate end, and such that said third axis is aligned with said locking hole when said coupling member is turned relative to said stem member to a lockable position; and a locking member including a spindle portion which is disposed in said through hole and retainingly movable relative to said second inner annular wall and which extends in the second radial direction and outwardly of said distal end to form an actuated end for external operation, and a latch portion which is secured to and extends from said spindle portion away from said actuated end and which is movable between a locked position where said latch portion is brought by said spindle portion to move into said locking hole, and an unlocked position where said latch portion is retracted outwardly of said locking hole, said intermediate portion being of a smaller diameter than those of said upper and lower portions so as to form an annular guiding groove between said upper and lower portions for guiding said latch portion in the unlocked position to move angularly when said coupling member is turned relative to said stem member about the swivel axis.

2. A locking device according to claim 1, wherein said spindle portion includes a distal segment adjacent to said actuated end and threadedly engageable with said second inner annular wall so as to be retainingly movable relative thereto.

3. A locking device according to claim 2, wherein said spindle portion includes a proximate segment opposite to said distal segment in the second radial direction and disposed to be in sliding contact with said second inner annular wall when said spindle portion is threadedly moved relative to said second inner annular wall, and a middle segment disposed between said proximate and distal segments and spaced apart from said second inner annular wall in a third radial direction relative to said second radial direction so as to define an annular chamber therebetween, said locking device further comprising a coil spring disposed in said annular chamber and wound around said middle segment so as to provide resistance to said spindle portion when said latch portion is moved to the unlocked position.

4. A locking device according to claim 1, further comprising a bushing member disposed to be turned with said coupling member, and including a third annular wall interposed between said first inner annular wall and said stem member, and extending in the axial direction to form a lower annular segment, which interrupts communication between said through hole and said intermediate portion, said third annular wall defining a bore extending along said third axis and aligned with said through hole so as to permit said latch portion to move into said locking hole.

\* \* \* \* \*